Patented June 27, 1939

2,164,248

UNITED STATES PATENT OFFICE 2,164,248

PRODUCTION OF LAMINATED FABRICS

Leslie Gordon Lawrie, Reginald John William Reynolds, and Eric Everard Walker, Blackley, Manchester, England, assignors to Imperial Chemical Industries Limited, a corporation of Great Britain No Drawing. Application September 25, 1935, Serial No. 42,140. In Great Britain September 26, 1934

5 Claims. (Cl. 154—2)

This invention relates to the manufacture of composite or laminated fabrics or threads.

Laminated fabrics have hitherto been made by the interposition of a sheet of adhesive material between plies of fabric or by the use of plies woven from two materials, one of which is heterogeneous and contains fibers of an adhesive nature.

This invention has as an object the preparation of improved composite fibrous articles. A further object is the preparation of laminated fabrics. A still further object is the preparation of composite threads. Other objects will appear hereinafter.

These objects are accomplished by the following invention wherein a fibrous organic material such as fibers or sheet material is superficially hydroxyalkylated and the thus superficially hydroxyalkylated material joined by heat and pressure to another fibrous organic material. In the preferred embodiment of the invention, fibrous cellulosic material is superficially hydroxy-alkylated and the thus superficially hydroxyalkylated material joined while wet to another sheet of material and the composite laminae united by the action of heat and pressure.

When cellulosic material is treated superficially with ethylene oxide as described in copending application Ser. No. 21,294, filed May 13, 1935 which has issued as U. S. Patent 2,109,295, or similarly, with glycide according to the process of the same application and is brought in a wet condition into contact with like material or with untreated cellulosic material, such as ordinary cotton, regenerated cellulose, linen or jute, and the two subjected to heat and pressure, adhesion of the materials is effected and in this manner composite fabrics may be produced without the use of resins or other adhesives as usually employed for the production of multiple layer materials, although if desired, such adhesives may be additionally employed.

Having thus outlined the principles and purposes of the invention, the following exemplifications thereof are added for purposes of illustration but not in limitation.

Example I

Finely woven bleached cotton fabric (14 parts) was mercerized by immersing it under tension according to the customary procedure in 50° Twaddell aqueous caustic soda. The mercerized fabric was then wrung out until there remained in the fabric 25 parts of mercerizing liquor. The moist fabric was then suspended in a chamber into which 3.8 parts (1 molecular proportion per 1 molecular proportion of cellulose reckoned as $C_6H_{10}O_5$) of ethylene oxide were passed. The chamber was closed and left for 17 hours.

The fabric was then washed and placed, while wet, in contact with ordinary cotton fabric and the two ironed until dry. The layers adhered and the resulting composite product had a stiff handle. If a stiffer material is required, more layers of the ethylene oxide treated material are ironed together while wet. Other methods of applying the necessary heat and pressure such as by means of heated calenders, hot drying cylinders and the like may be used.

Example II

Closely woven cotton fabric (162 parts) was mercerized in aqueous caustic soda of 50° Twaddell, removed, pressed, and treated with 44 parts of ethylene oxide in a closed vessel for 17 hours at room temperature. The fabric was washed and then joined while wet to a cotton fabric as in Example I.

Example III

Cotton muslin (52 parts) was mercerized with 50° Twaddell caustic soda, pressed and treated with 11 parts of ethylene oxide (¾ mol per $C_6H_{10}O_5$ unit) in a closed vessel for 17 hours at room temperature. The material was then washed in water and dilute acetic acid (1%), rinsed in water and then joined while wet as in Example I to a sheet of cotton fabric.

Example IV

Cotton muslin (14 parts) was treated with alkali as described in Example I, immersed in a solution of ethylene oxide (7 parts) in carbon tetrachloride (500 parts) and left for 20 hours at ordinary temperature (20° C.). The fabric was then washed and joined while wet to a sheet of cotton fabric as in Example I.

Example V

In place of the solution of ethylene oxide in carbon tetrachloride of Example IV, there was used a solution of 18 parts of ethylene oxide in 500 parts of benzene, the hydroxyethylation being continued for 20 hours at room temperature.

Example VI

Cotton muslin (14 parts) preheated with alkali as in Example I, was immersed in 40 parts of propylene oxide and left for 20 hours at 20° C. The product was washed and joined as in Example I to a cotton fabric.

Example VII

Instead of carrying out the treatment described in Example VI at 20°, the cotton may be heated with the propylene oxide for 3 hours in a vessel with a reflux condenser, washed and joined as in Example I to a cotton fabric.

Example VIII

Cotton muslin (15 parts) was placed in 50° Twaddell aqueous sodium hydroxide for 5 minutes and excess alkali removed by squeezing. The fabric was then immersed in 50 parts of a solution consisting of 2 parts of glycide and 48 parts of acetone. The fabric was allowed to remain in contact with the solution for 15 hours at room temperature, then washed and joined while wet to a cotton fabric as in Example I.

Example IX

Cotton muslin (20 parts) pretreated with alkali as described in Example I was immersed in 100 parts of benzene containing 2 parts of glycide and heated for 1 hour at 80° C. in a vessel fitted with a reflux condenser. The fabric was then removed, washed free from alkali and joined to the cotton fabric as in Example I.

The procedures described in the above examples are applicable similarly to artificial cellulose fiber for instance regenerated cellulose. Although the main interest of this invention is in connection with fabrics, woven or knit, the process is likewise applicable to cellulosic yarn, thread or fiber. The process is applicable to organic fibrous materials in general, including keratin materials such as silk, wool, leather, etc., as well as the cellulosic fibers, cotton, linen, jute, hemp, etc., and the regenerated cellulosic fibers such as those resulting from the viscose, cuprammonium, or nitrocellulose processes. The greater desirability of the results obtained with cellulosic fibers and particularly cotton and linen fibers, makes the cellulosic fibers a preferred raw material for the processes and products of the present invention.

A superficially hydroxyalkylated material, e. g. cellulose, may be joined to a fabric of a different kind e. g. wool or silk, and thus obtain a backed material having desirable properties. The embodiment of the invention wherein a cellulosic material is superficially hydroxyalkylated and joined to a treated or untreated cellulosic material represents the preferred embodiment.

The hydroxyalkylating agents of the examples are alkylene oxide compounds having the general formula:

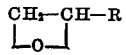

wherein R may be H, CH$_3$ or CH$_2$OH. When R is H the compound is ethylene oxide, when it is CH$_3$ the compound is propylene oxide and when R is CH$_2$OH the compound is glycide.

In place of the ethylene oxide, propylene oxide and glycide of the examples, other hydroxyalkylating agents, such as ethylene chlorhydrin, epi-chlorhydrin, pseudo butylene oxide, alpha beta dimethylethylene oxide, isobutylene oxide (alpha alpha dimethylethylene oxide) ethylethylene oxide, methylphenylethylene oxide (alpha-methyl-beta phenylethylene oxide) etc., may be employed.

It is preferred that a lower etherifying agent be used, namely one containing up to three carbon atoms. The treatment may be direct e. g. with gaseous ethylene oxide or liquid propylene oxide or glycide or the agent may usually be dissolved in a suitable solvent such as dioxane, benzene, tetrachlorethane or carbon tetrachloride. The temperature of substitution may vary widely, hydroxyalkylation being conducted conveniently at room temperature.

The details of the procedure may be varied within wide limits. The mercerization step may be carried out according to any of the well known procedures for mercerizing material and need not be confined to the concentrations and details of procedure mentioned above for illustrative purposes. The caustic soda should be of at least 11% strength but is preferably stronger and may be as strong as 50%, although strengths of 18–22% are ordinarily employed. Likewise, the time of exposure to the alkylating agents, for example, ethylene oxide, may be varied within limits and depends further upon the degree of superficial etherification or substitution desired. The quantity of ethylene oxide, as has been indicated in the examples, may be varied considerably depending upon the kind of fabric treated, the mode of treatment and the result desired. When a solvent is employed the large quantity of solvent reduces the concentration of the ethylene oxide at the zone of reaction, that is, the surface of contact between the fabric and the ethylene oxide; therefore a larger quantity of the latter is permissible.

The extent of substitution will vary to some extent depending upon the substituent entering the cellulosic molecule. About one to one and one-half molecular proportions or less of hydroxyalkylating agent per C$_6$H$_{10}$O$_5$ unit of the cellulose and preferably one-third to one mol is employed. Where the hydroxyalkylating agent is dissolved in a solvent higher quantities, even as much as 10 mols of ethylene oxide per C$_6$H$_{10}$O$_5$ unit may be employed.

Example X

Cotton thread subjected to the treatment with etherifying agents as in Examples I and II, may be advantageously used in the weaving of a fabric with untreated cellulose, natural or regenerated, for the preparation of a laminated fabric permeable to gas or water since the adhesive film is not continuous.

Animal fibers composed essentially of keratin react superficially with alkylene oxides or chlorohydrins to form hydroxyalkyl derivatives, functioning in an analogous manner to form a superficial adhesive coating. It is to be noted, however, that the results with cellulosic materials are such that these materials form the preferred base materials for laminated fabrics of the present invention.

Laminated fabrics built from treated material of low shrinkage value and untreated material of high shrinkage value have naturally poor resistance to washing which causes them to pull apart because of the great wrinkling. The superficial coating of a thermoplastic layer of cellulose or keratin, and preferably a cellulose derivative, on a core of unchanged cellulose or keratin, makes possible the preparation of laminated fabrics equally as well as from the use of threads consisting entirely of thermoplastic derivatives and with the additional advantage due to the reinforcing action of the unchanged cellulose or keratin core.

As many apparently widely different embodiments of this invention may be made without departing from the spirit and scope thereof, it is to be understood that we do not limit ourselves to the specific embodiments thereof except as defined in the appended claims.

We claim:

1. A process for producing laminated fabrics which comprises treating a cellulosic fabric in the presence of alkali with an alkylene oxide compound of the general formula

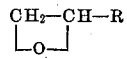

wherein R stands for H, CH$_3$ and CH$_2$OH, in proportion of from 1/3 to 1½ mols of the latter per unit of C$_6$H$_{10}$O$_5$ in the fabric to produce a superficial hydroxyalkylation equivalent to that produced at about room temperature and a time from about 17 to about 20 hours, washing the product free of the reagents used and joining the product, while wet with water to another fibrous cellulosic sheet material by heat and pressure equivalent to ironing.

2. Process as in claim 1, the alkylene oxide compound being dissolved in a solvent.

3. A process for producing laminated fabrics which comprises treating a cellulosic fabric in the presence of alkali with ethylene oxide to produce a superficial hydroxyalkylation equivalent to that produced at about room temperature and a time from about 17 to about 20 hours, washing the product free of the reagents used and joining the product, while wet with water to another fibrous cellulosic sheet material by heat and pressure equivalent to ironing.

4. Process as in claim 3, the ethylene oxide being dissolved in carbon tetrachloride.

5. The process of laminating fabrics which comprises treating cotton fabric with aqueous ethylene oxide in proportion not exceeding 1½ mols per unit of C$_6$H$_{10}$O$_5$ in the fabric, dissolved in an inert organic solvent to produce a superficial hydroxyalkylation equivalent to that produced at about room temperature and a time of from about 17 to about 20 hours, washing the product free of the reagents used and joining the product, while wet with water to another fibrous cellulosic sheet material by heat and pressure equivalent to ironing.

LESLIE GORDON LAWRIE.
REGINALD JOHN WILLIAM REYNOLDS.
ERIC EVERARD WALKER.